(12) United States Patent
Arnold

(10) Patent No.: US 10,557,571 B2
(45) Date of Patent: Feb. 11, 2020

(54) HOSE RETAINER STANDS

(71) Applicant: Lance Arnold, Elyria, OH (US)

(72) Inventor: Lance Arnold, Elyria, OH (US)

(73) Assignee: Lance Arnold, Elyria, OH (US)

( * ) Notice: Subject to any disclaimer, the term of this patent is extended or adjusted under 35 U.S.C. 154(b) by 151 days.

(21) Appl. No.: 15/618,485

(22) Filed: Jun. 9, 2017

(65) Prior Publication Data

US 2017/0370502 A1 Dec. 28, 2017

Related U.S. Application Data

(60) Provisional application No. 62/381,085, filed on Aug. 30, 2016, provisional application No. 62/355,405, filed on Jun. 28, 2016.

(51) Int. Cl.
*A47G 29/00* (2006.01)
*F16L 3/20* (2006.01)

(52) U.S. Cl.
CPC ..................... *F16L 3/20* (2013.01)

(58) Field of Classification Search
CPC ............ F16L 3/20; F16L 3/223; B05B 15/063
USPC .............. 248/80, 75, 83, 68.1; 211/68, 60.1; 174/68.1
See application file for complete search history.

(56) References Cited

U.S. PATENT DOCUMENTS

| 2,440,745 | A | | 5/1948 | Hauck |
| 2,490,839 | A | | 12/1949 | Shaffer et al. |
| 5,419,734 | A | | 5/1995 | Van Sickle |
| 5,947,583 | A | * | 9/1999 | Castano .................. A63D 15/10 211/68 |
| 6,332,595 | B1 | | 12/2001 | Klucznik |
| 7,299,935 | B2 | * | 11/2007 | Skaley .................... F16L 3/223 211/60.1 |
| 9,365,168 | B2 | | 6/2016 | Boutin |

* cited by examiner

*Primary Examiner* — Todd M Epps
(74) *Attorney, Agent, or Firm* — Mark E. Bandy; Rankin Hill & Clark, LLP

(57) ABSTRACT

A hose retainer stand is described. The retainer stand supports and organizes collections of hoses or other flexible members. In many applications, the retainer stand elevates hoses above ground to thereby reduce potential for damage to the hoses. Also described are methods of retaining and supporting hoses by use of the retainer stands.

19 Claims, 7 Drawing Sheets

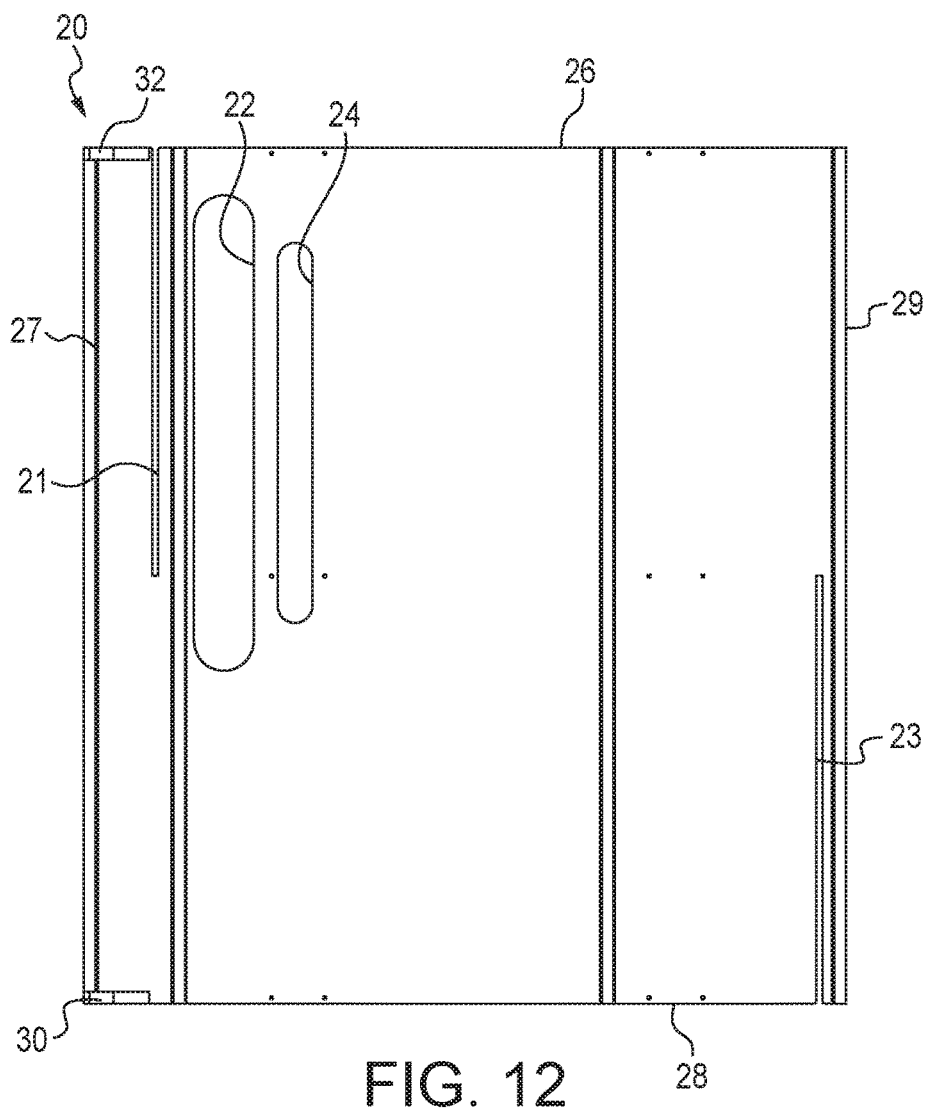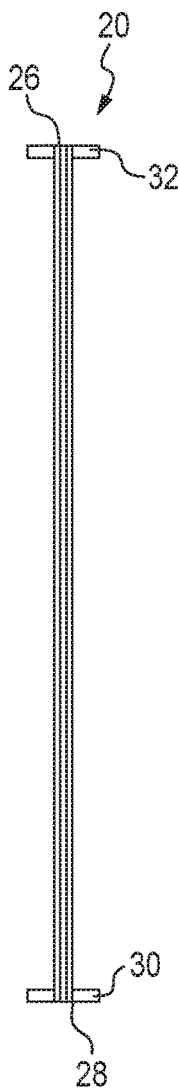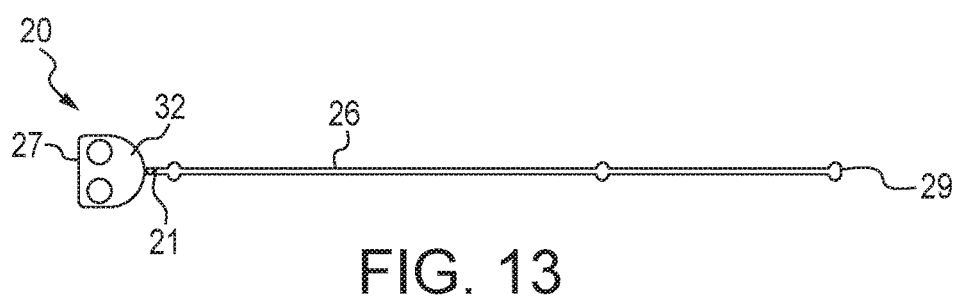
FIG. 12
FIG. 15
FIG. 13
FIG. 14

HOSE RETAINER STANDS

CROSS REFERENCES TO RELATED APPLICATIONS

This application claims priority from U.S. provisional application Ser. No. 62/355,405 filed on Jun. 28, 2016; and Ser. No. 62/381,085 filed on Aug. 30, 2016.

FIELD

The present subject matter relates to support systems for retaining and supporting hoses and other flexible members.

BACKGROUND

A wide array of stands and support systems for hoses or flexible members are known in the art. Many include trays or brackets upon which the hoses rest. Although satisfactory, such trays or brackets only support hoses collectively and do not individually segregate hoses, which can be important in identifying one hose in a collection of hoses. Furthermore, many such trays or brackets do not prevent lateral or horizontal movement of hoses. Moreover, many trays or brackets are mounted to stationary fixtures or walls and thus are not easily transportable. Accordingly, a need remains for a hose retainer stand that provides for individual segregation, improved restraint of hoses, and which is easily transportable.

SUMMARY

The difficulties and drawbacks associated with previous approaches are addressed in the present subject matter as follows.

In one aspect, the present subject matter provides a hose retainer stand comprising a support panel defining at least one elongated slot extending through the support panel. The retainer stand also comprises a front panel defining a plurality of apertures extending through the front panel. Each aperture is sized to receive a hose to be supported. The front panel is secured to the support panel and extends transversely therefrom. In certain embodiments, the retainer stand additionally comprises a rear panel defining at least one elongated slot extending through the rear panel. The rear panel is secured to the support panel and extends transversely therefrom and in the same direction as the front panel. The rear panel is also spaced from the front panel.

In another aspect, the present subject matter comprises a hose retainer stand comprising a planar support panel defining a first end, a second end opposite the first end, a top edge extending between the first and second ends, and a bottom edge opposite the top edge. The bottom edge extends between the first and second ends. The support panel further defines a first elongated slot and a second elongated slot. The first and second slots are oriented parallel with the first end and disposed proximate the first end of the support panel. The retainer stand also comprises a planar front panel affixed to and extending from the first end of the support panel. The front panel defines a top edge and a bottom edge opposite the top edge. The front panel further defines a plurality of circular apertures extending through the front panel, each aperture sized to receive a hose to be supported. The retainer stand additionally comprises a planar rear panel affixed to and extending from the second end of the support panel. The rear panel extends parallel with the front panel. The rear panel defines a top edge and a bottom edge opposite the top edge. The rear panel defines an elongated slot extending through the rear panel. The slot of the rear panel is disposed proximate the second end of the support panel.

In still another aspect, the present subject matter provides a method for supporting and elevating at least one hose above ground. The method comprises providing a hose retainer stand including (i) a support panel having at least one elongated slot extending through the support panel, (ii) a front panel having a plurality of apertures, the front panel secured to the support panel and extending transversely therefrom, and (iii) a rear panel having at least one elongated slot, the rear panel secured to the support panel and extending transversely therefrom. The hose retainer stand defines a bottom edge. The method also comprises positioning the hose retainer stand near a hose to be supported and elevated such that the bottom edge of the hose retainer stand contacts the ground. The method additionally comprises inserting the hose through at least one of (i) the elongated slot of the support panel and the elongated slot of the rear panel, and (ii) an aperture of the plurality of apertures of the front panel. Upon such insertion, the hose is supported and elevated above ground.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

FIG. 12 is an elevational view of a support panel used in the hose retainer stand of the present subject matter.

FIG. 13 is a top view of the support panel shown in FIG. 12.

FIG. 14 is a bottom view of the support panel depicted in FIG. 12.

FIG. 15 is a side view of the support panel shown in FIG. 12.

DETAILED DESCRIPTION OF THE EMBODIMENTS

The present subject matter provides assemblies for retaining and/or supporting hoses and/or other flexible members.

In many embodiments, the present subject matter provides retainer stands for supporting and elevating collections of hoses above ground. The retainer stands generally comprise a support stand, a front panel extending from the support stand, and a rear panel spaced from the front panel and which also extends from the support panel. The front panel includes one or more openings or apertures extending through the thickness of the front panel, through which one or more hoses are inserted for supporting and/or retaining. The support panel includes one or more openings, apertures, or elongated slots extending through its thickness, also for receiving one or more hoses. The rear panel also includes one or more openings, apertures, or elongated slots extending through its thickness, also for receiving one or more hoses. The panels are arranged and secured relative to one another such that the retainer stand is self supporting and stable. In many embodiments, the front panel extends transversely from the support panel, and the rear panel also extends transversely from the support panel. In particular embodiments, the front and rear panels extend from the support panel in the same direction and are generally parallel to each other.

Figure 1:
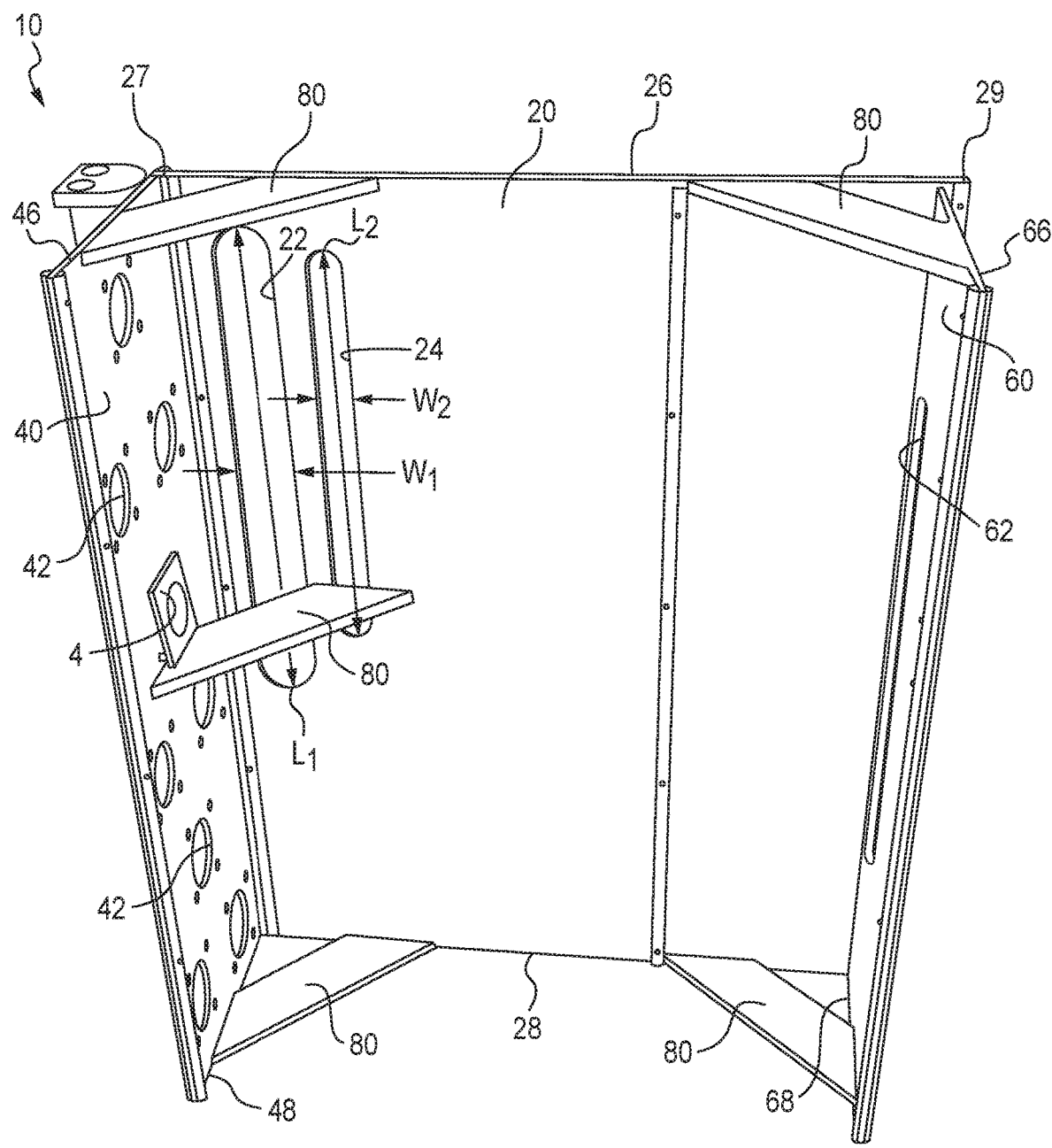
FIG. 1 is a perspective view of an embodiment of a hose retainer stand in accordance with the present subject matter.
Figure 2:
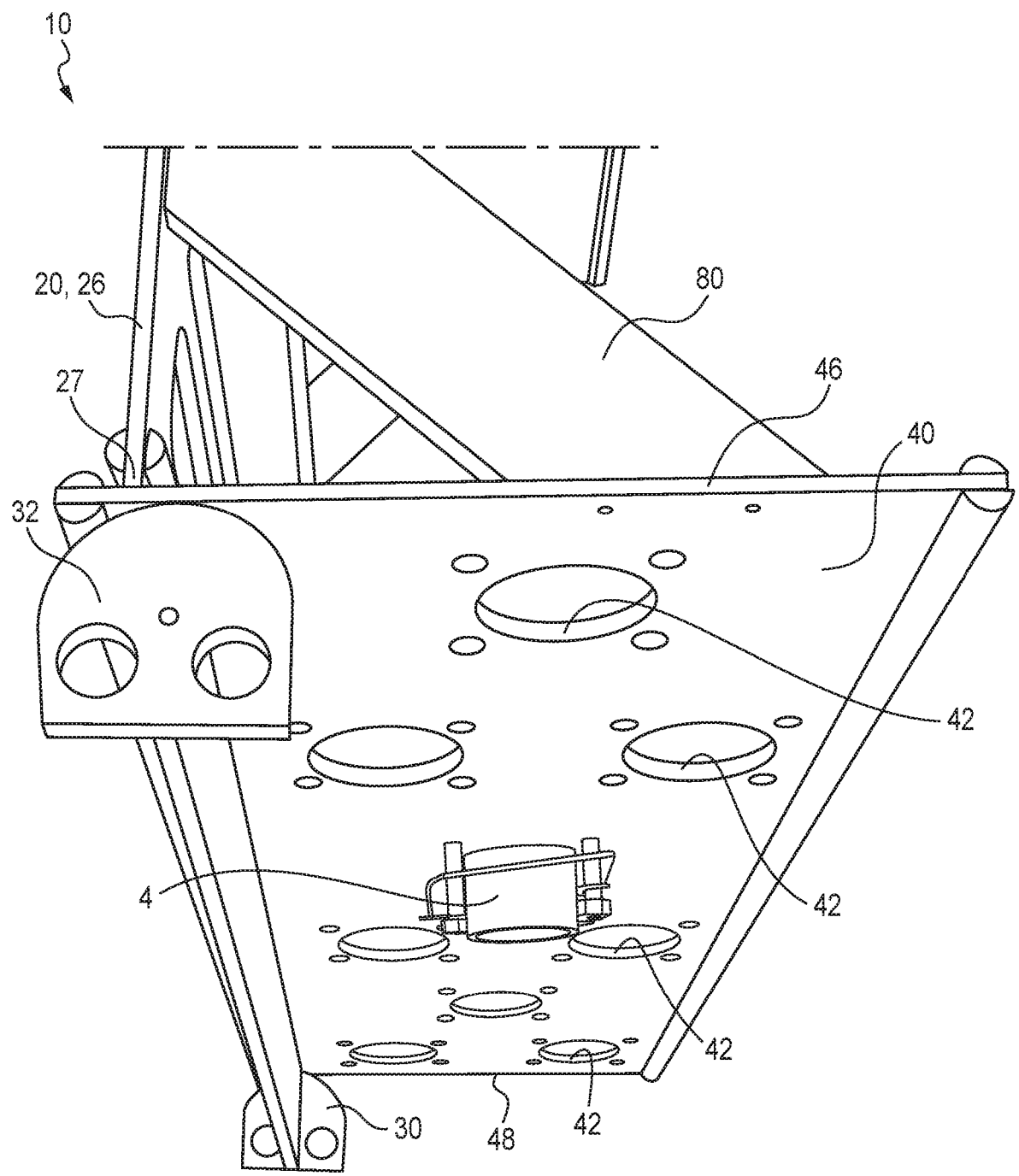
FIG. 2 is a detailed perspective view of a front panel portion of the hose retainer stand depicted in FIG. 1.

FIGS. 1 and 2 illustrate an embodiment of a hose retainer stand 10 in accordance with the present subject matter. The retainer stand 10 generally comprises a planar support panel 20 defining first and second elongated slots or openings 22, 24 respectively, a top edge 26, a first end 27, a bottom edge 28, and a second end 29. The support panel 20 also includes a first mounting bracket 30 disposed proximate the bottom edge 28, and a second mounting bracket 32 disposed proximate the top edge 26. In particular versions, the width $W_2$ of the second slot 24 is less than the width $W_1$ of the first slot 22. And in particular versions, the length $L_2$ of the second slot 24 is less than the length of the first slot 22. It will be understood that the present subject matter hose retainer stands may include one or more slots featuring different characteristics.

The hose retainer stand 10 also comprises a front planar panel 40 that defines one or more apertures 42. In many versions, the apertures are circular and are sized to fittingly receive and engage hose(s) to be supported. The front panel 40 may define a number of apertures such as from 2 to about 20 or more. In certain versions, a total of nine (9) apertures are provided. The front panel defines a top edge 46 and a bottom edge 48.

The hose retainer stand 10 may additionally comprise a planar rear panel 60. The rear panel 60 defines one or more elongated slots such as slot 62. The rear panel defines a top edge 66 and a bottom edge 68.

Generally, the front panel 40 is secured to the support panel 20 and extends traversely therefrom. Similarly, the rear panel 60 is secured to the support panel 20 and extends transversely therefrom. In particular versions, the front and rear panels 40, 60 extend in the same direction, are spaced from one another, and/or are oriented parallel to one another. However, it will be understood that the present subject matter includes versions in which the front and rear panels extend in different directions, and/or are not parallel with one another.

In certain embodiments, the hose retainer stand 10 may also comprise one or more support bracket(s) such as support brackets 80 shown in FIGS. 1-2. Typically, one or more support bracket(s) extend between the support panel 20 and the front panel 40; and/or the rear panel 60 and the support panel 20. The support bracket(s) 80 can be separately formed or integrally formed with one or more other components of the stand.

FIGS. 1-2 additionally depict an optional support element 4 disposed in an aperture 42 of the front panel 40. The support element 4 is sized and shaped to fittingly receive and/or engage a hose to be supported in the stand 10. The support element 4 may be used to provide additional support and/or for engaging or affixing a hose to the stand 10.

Figure 3:
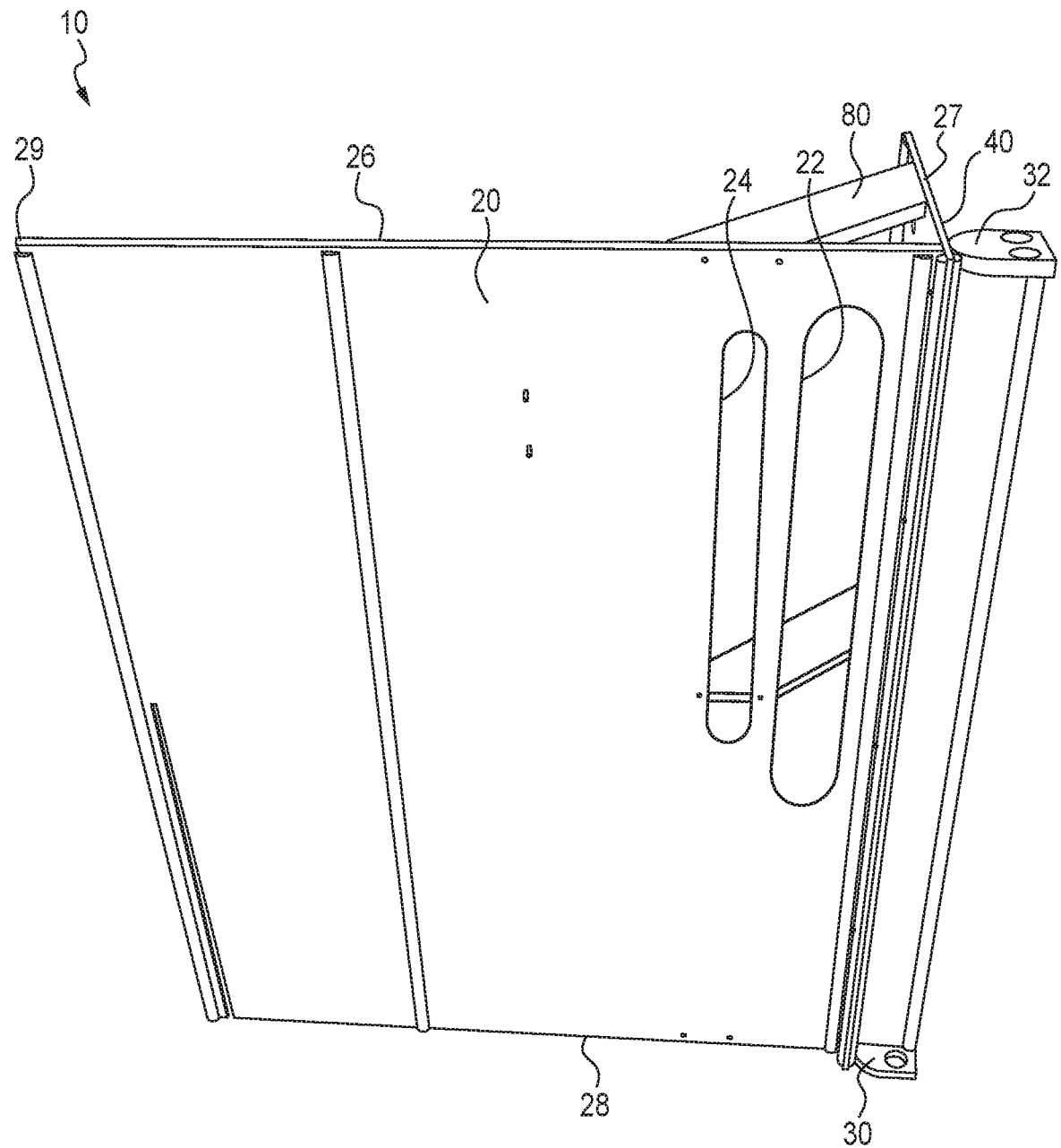
FIG. 3 is a perspective view of another embodiment of a support panel portion of the hose retainer stand in accordance with the present subject matter.
Figure 7:
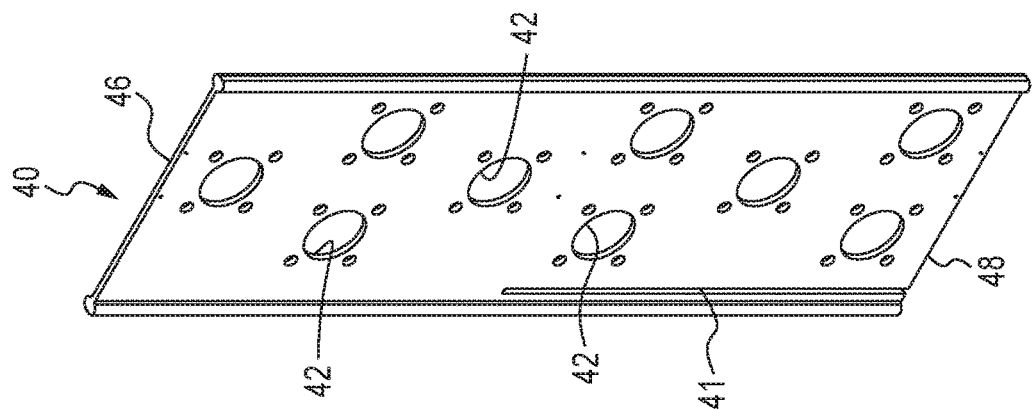
FIG. 7 is a perspective view of the front panel depicted in FIG. 4.
Figure 6:
FIG. 6 is a side view of the front panel shown in FIG. 4.
Figure 5:
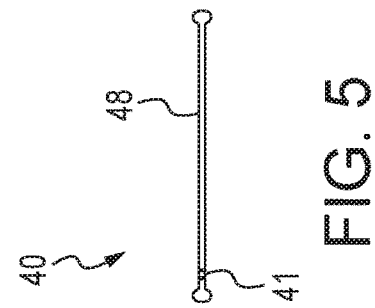
FIG. 5 is a bottom view of the front panel shown in FIG. 4.
Figure 4:
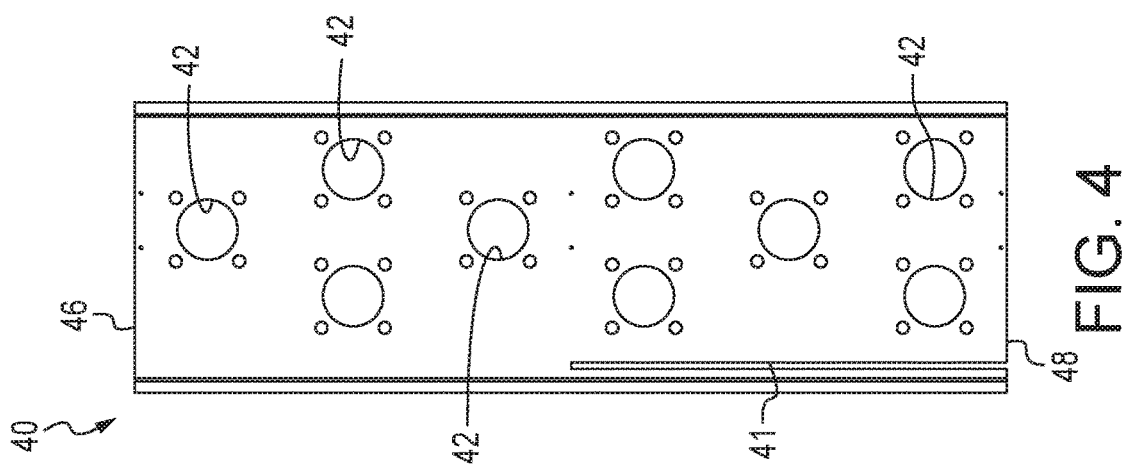
FIG. 4 is an elevational view of a front panel used in the hose retainer stand of the present subject matter.

FIG. 3 illustrates another embodiment of the hose retainer stand 10 in which the stand is free of the rear panel 60 shown in FIGS. 1-2. This version may be preferred for particular applications in which reduced cost is desired and/or a smaller "footprint" for the stand is desired.

FIGS. 4-7 illustrate additional details of the front panel 40 used in the hose retainer stands of the present subject matter. It will be noted that the apertures 42 are generally defined in the panel to be equidistant from one another. However, the present subject matter includes such panels having other arrangements of apertures including nonsymmetrical arrangements of apertures.

FIGS. 8-11 illustrate additional features of the rear panel 60 used in the present subject matter hose retainer stands. In many versions, the slot 62 is located an equal distance from the top edge 66 and the bottom edge 68. Upon affixment of the rear panel 60 to the support panel 20, the slot 62 is typically disposed proximate the second end 29 of the support panel 20. However, it will be appreciated that the present subject matter is not limited to these aspects and includes other arrangements.

FIGS. 12-16 depict additional details of the support panel 20 used in the hose retainer stands of the present subject matter. The support panel includes slots 22 and 24 as previously noted. In many embodiments, the slots 22, 24 are oriented parallel with the first end 27 of the support panel 20, and/or disposed proximate the first end 27 of the support panel 20.

In particular embodiments of the hose retainer stand 10, the top edge 26 of the support panel 20, the top edge 46 of the front panel 40, and the top edge 66 of the rear panel 60 extend within a common plane. And, in certain embodiments, the bottom edge 28 of the support panel 20, the bottom edge 48 of the front panel 40, and the bottom edge 68 of the rear panel 60 extend within a common plane.

As noted, the hose retainer stands may include one or more mounting brackets. In certain versions, an outer face of the mounting bracket extends within a common plane as a corresponding top edge or bottom edge of the adjoining panels. Thus, for example the first mounting bracket 30 defines an outer face which extends within a common plane as the bottom edge 28 of the support panel 20. And, the second mounting bracket 32 defines an outer face which extends within a common plane as the top edge 26 of the support panel 20. The mounting bracket(s) may be separately formed or integrally formed with one or more other components of the stand.

The present subject matter includes versions in which the front and rear panels extend from the same face of the support panel, or the front and rear panels each extend from a different face of the support panel. The front and/or rear panels may be oriented at right angles to the support panel, or may be oriented at angles less than 90° or greater than 90° with respect to the support panel. The angles at which the front and rear panels are oriented with respect to the support panel may be the same or different.

In certain embodiments of the stand, one or more of the components of the stand are configured to promote convenient assembly of the stand. One or more assembly slots are provided in each of the support panel 20, the front panel 40, and the rear panel 60. The slots are sized and configured to slidingly receive an edge or portion of another panel and retain and/or engage the other panel within the slot. Specifically, referring to FIGS. 4, 5, and 7, the front panel 40 defines an assembly slot 41 extending from the bottom edge 48 of the front panel to an interior region of the front panel 40. The assembly slot 41 in this embodiment extends parallel to a side or edge region of the panel 40. The assembly slot 41 is sized to receive and engage a portion of the support panel 20 as described in greater detail herein.

Figure 11:
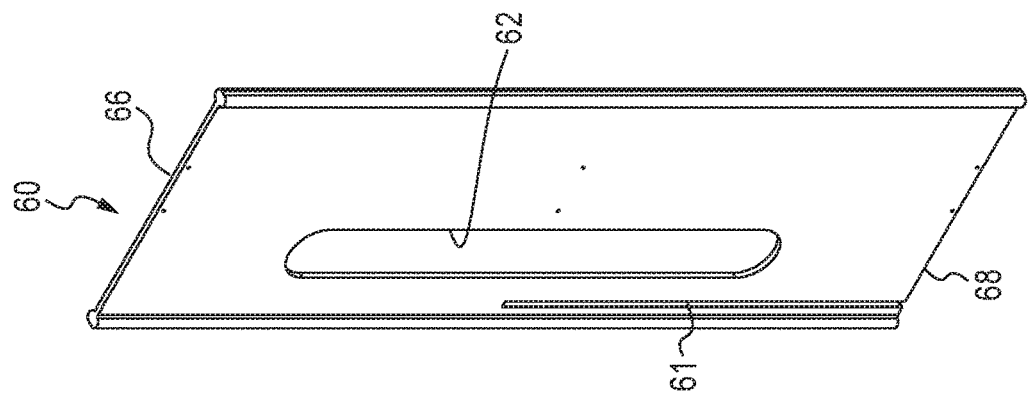
FIG. 11 is a perspective view of the rear panel illustrated in FIG. 8.
Figure 10:
FIG. 10 is a side view of the rear panel depicted in FIG. 8.
Figure 9:
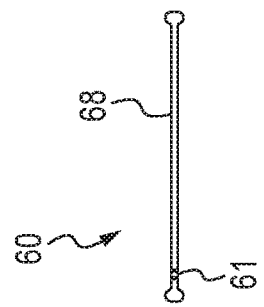
FIG. 9 is a bottom view of the rear panel shown in FIG. 8.
Figure 8:
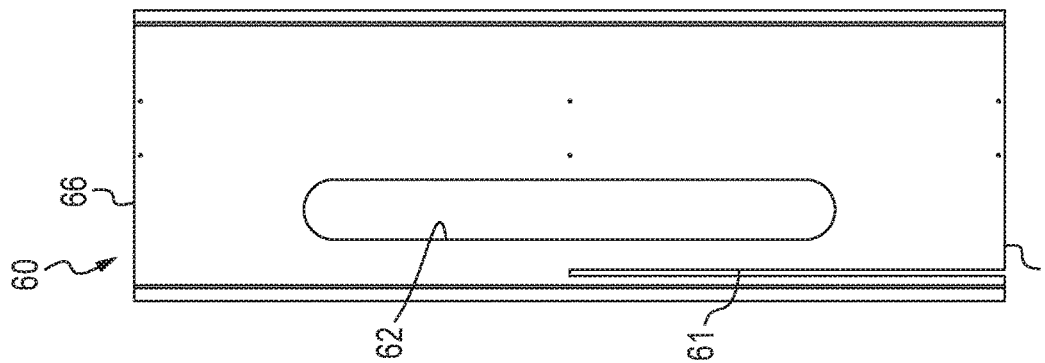
FIG. 8 is an elevational view of a rear panel used in the hose retainer stand of the present subject matter.
Figure 16:
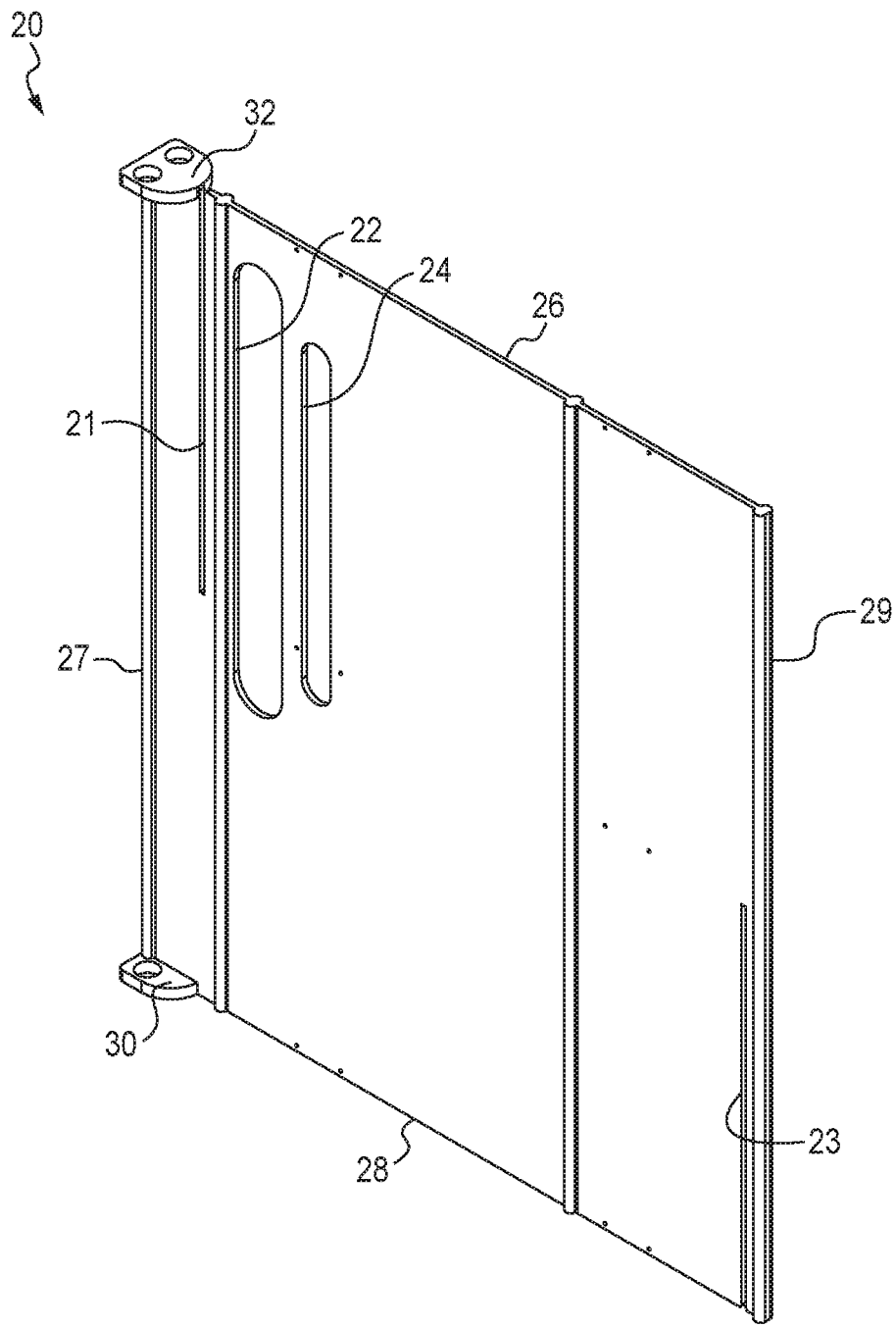
FIG. 16 is a perspective view of the support panel shown in FIG. 12.

Similarly, referring to FIGS. 8, 9, and 11, the rear panel 60 defines an assembly slot 61 extending from the bottom edge 68 of the rear panel to an interior region of the rear panel 60. The assembly slot 61 in this version extends parallel to a side or edge region of the panel 60. The assembly slot 61 is sized to receive and engage a portion of the support panel 20 as described in greater detail herein.

Referring to FIGS. 12, 13, 14, and 16, the support panel 20 defines a first assembly slot 21 extending from the top edge 26 of the support panel to an interior region, and a second assembly slot 23 extending from the bottom edge 28. The assembly slots are typically parallel to one another and to the side edges of the support panel 20 as best shown in FIG. 12.

The assembly slots 21, 23, 41, and 61 facilitate assembly of the stand. The front panel 40 can be readily engaged with the support panel 20 by aligning the entrance of assembly slot 41 at the bottom edge 48 of the front panel 40 with the entrance of assembly slot 21 at the top edge 26 of the support panel 20 and urging the front and support panels together toward their assembled state such as shown in FIG. 1. Similarly, the rear panel 60 can be readily engaged with the support panel 20 by aligning the entrance of assembly slot 61 at the bottom edge 68 of the rear panel 60 with the entrance of assembly slot 23 at the bottom edge 28 of the support panel 20 and urging the rear and support panels together toward one another to their assembled state such as shown in FIG. 1.

It will be understood that the present subject matter includes a wide variety of alternate configurations and orientations of the assembly slots. In no way should the present subject matter be limited to the particular embodiments shown in FIGS. 1-16.

The retainer stand and its components can be formed from a wide array of materials. Representative and non-limiting examples of such materials include metal, wood, plastics, composite materials, and combinations thereof. In a particular embodiment, each of the support panel, front panel, and rear panel is formed from a plastic such as polyethylene.

The present subject matter also provides methods for supporting, organizing, and/or elevating one or more hoses above ground. The methods comprise providing a hose retainer stand as described herein, and positioning the stand near one or more hoses near hose(s) that are to be supported and/or elevated above ground. The stand is oriented such that a bottom edge of the stand is contacted with the ground. This orientation ensures that the slots of the support panel and the rear panel are spaced above the ground since all slots are disposed proximate the top edge of the stand. One or more hoses are then inserted through the elongated slot(s) defined in the support panel or the elongated slot defined in the rear panel. After insertion through a slot, the one or more hoses are then inserted through aperture(s) in the front panel. Typically, each hose is inserted through a different corresponding aperture. The sequence of insertions is not critical. Hoses can be inserted in the apertures first and then the slot(s); or vice versa.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A hose retainer stand comprising:
a support panel defining at least one elongated slot extending through the support panel;
a front panel defining a plurality of apertures extending through the front panel, each aperture sized to receive a hose to be supported, the front panel secured to the support panel and extending transversely therefrom;
wherein the plurality of apertures define a number of apertures within a range of from 2 to 20;
wherein the support panel defines a top edge and an oppositely located bottom edge, the support panel including a first mounting bracket extending from the bottom edge.

2. The hose retainer stand of claim 1 further comprising:
a rear panel defining at least one elongated slot extending through the rear panel, the rear panel secured to the support panel and extending transversely therefrom and in the same direction as the front panel, the rear panel spaced from the front panel.

3. The hose retainer stand of claim 2 wherein the rear panel defines a top edge and an oppositely located bottom edge, the at least one elongated slot of the rear panel located an equal distance from the top edge and the bottom edge of the rear panel.

4. The hose retainer stand of claim 1 wherein the support panel defines a first elongated slot and a second elongated slot, the second elongated slot having a width less than a width of the first elongated slot.

5. The hose retainer stand of claim 4 wherein a width of the elongated slot of the rear panel is the same as the width of the first elongated slot of the support panel.

6. The hose retainer stand of claim 1 wherein the support panel defines a first elongated slot and a second elongated slot, the second elongated slot having a length less than a length of the first elongated slot.

7. The hose retainer stand of claim 1 wherein the front panel defines 9 apertures.

8. The hose retainer stand of claim 1 wherein the support panel further includes a second mounting bracket extending from the top edge.

9. The hose retainer stand of claim 1 wherein the at least one elongated slot is located closer to the top edge of the support panel than the bottom edge of the support panel.

10. The hose retainer stand of claim 1 further comprising:
at least one support bracket extending between the support panel and the front panel; and at least one support bracket extending between the support panel and the rear panel.

11. A hose retainer stand comprising:

a planar support panel defining a first end, a second end opposite the first end, a top edge extending between the first and second ends, and a bottom edge opposite the top edge, the bottom edge extending between the first and second ends, the support panel further defining a first elongated slot and a second elongated slot, the first and second slots oriented parallel with the first end and disposed proximate the first end of the support panel;

a planar front panel affixed to and extending from the first end of the support panel, the front panel defining a top edge and a bottom edge opposite the top edge, the front panel further defining a plurality of circular apertures extending through the front panel, each aperture sized to receive a hose to be supported;

a planar rear panel affixed to and extending from the second end of the support panel, the rear panel extending parallel with the front panel, the rear panel defining a top edge and a bottom edge opposite the top edge, the rear panel defining an elongated slot extending through the rear panel, the slot of the rear panel disposed proximate the second end of the support panel.

12. The hose retainer of claim 11 wherein a width of the first elongated slot defined in the support panel is greater than a width of the second elongated slot defined in the support panel.

13. The hose retainer of claim 11 wherein a length of the first elongated slot defined in the support panel is greater than a width of the second elongated slot defined in the support panel.

14. The hose retainer of claim 11 wherein the plurality of circular apertures define a number of circular apertures within a range of from 2 to 20.

15. The hose retainer of claim 11 wherein the top edges of the support panel, the front panel, and the rear panel extend within a common plane.

16. The hose retainer of claim 11 wherein the bottom edges of the support panel, the front panel, and the rear panel extend within a common plane.

17. The hose retainer of claim 11 further comprising:

a first mounting bracket affixed to the support panel proximate the first end of the support panel, wherein an outer face of the first mounting bracket and the bottom edge of the support panel extend within a common plane.

18. The hose retainer of claim 17 further comprising:

a second mounting bracket affixed to the support panel proximate the first end of the support panel, wherein an outer face of the second mounting bracket and the top edge of the support panel extend within a common plane.

19. A method for supporting and elevating at least one hose above ground, the method comprising:

providing a hose retainer stand including (i) a support panel having at least one elongated slot extending through the support panel, (ii) a front panel having a plurality of apertures, the front panel secured to the support panel and extending transversely therefrom, and (iii) a rear panel having at least one elongated slot, the rear panel secured to the support panel and extending transversely therefrom, the hose retainer stand defining a bottom edge;

positioning the hose retainer stand near a hose to be supported and elevated such that the bottom edge of the hose retainer stand contacts the ground;

inserting the hose through at least one of (i) the elongated slot of the support panel and the elongated slot of the rear panel, and (ii) an aperture of the plurality of apertures of the front panel;

whereby the hose is supported and elevated above ground.

\* \* \* \* \*